Nov. 17, 1942.   M. LIBBY ET AL   2,302,561
FILM MOUNTER
Filed Feb. 8, 1941   2 Sheets-Sheet 1
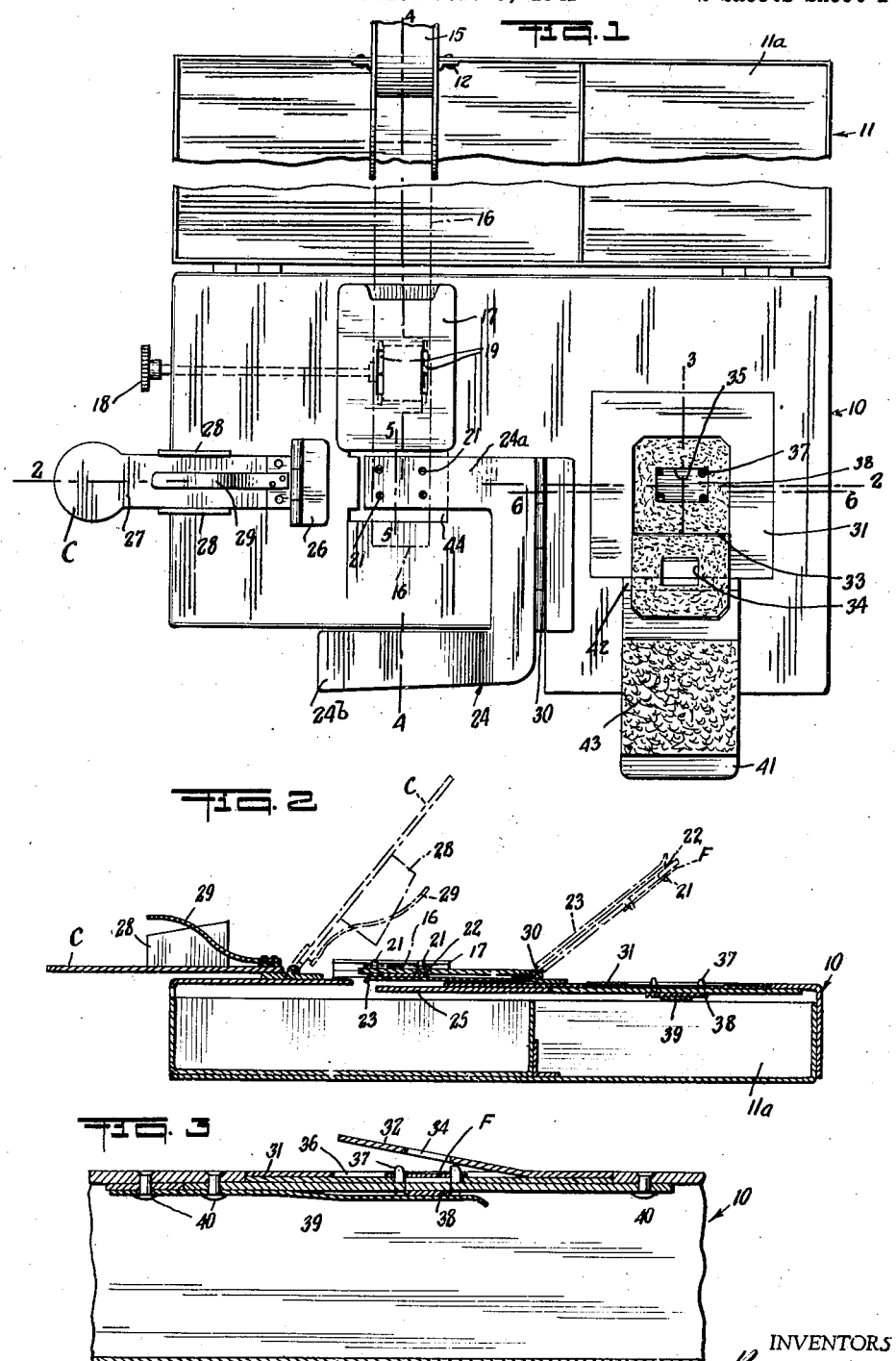
INVENTORS
Maurice Libby
and Herman Roth
BY S. Stephen Baker
ATTORNEY

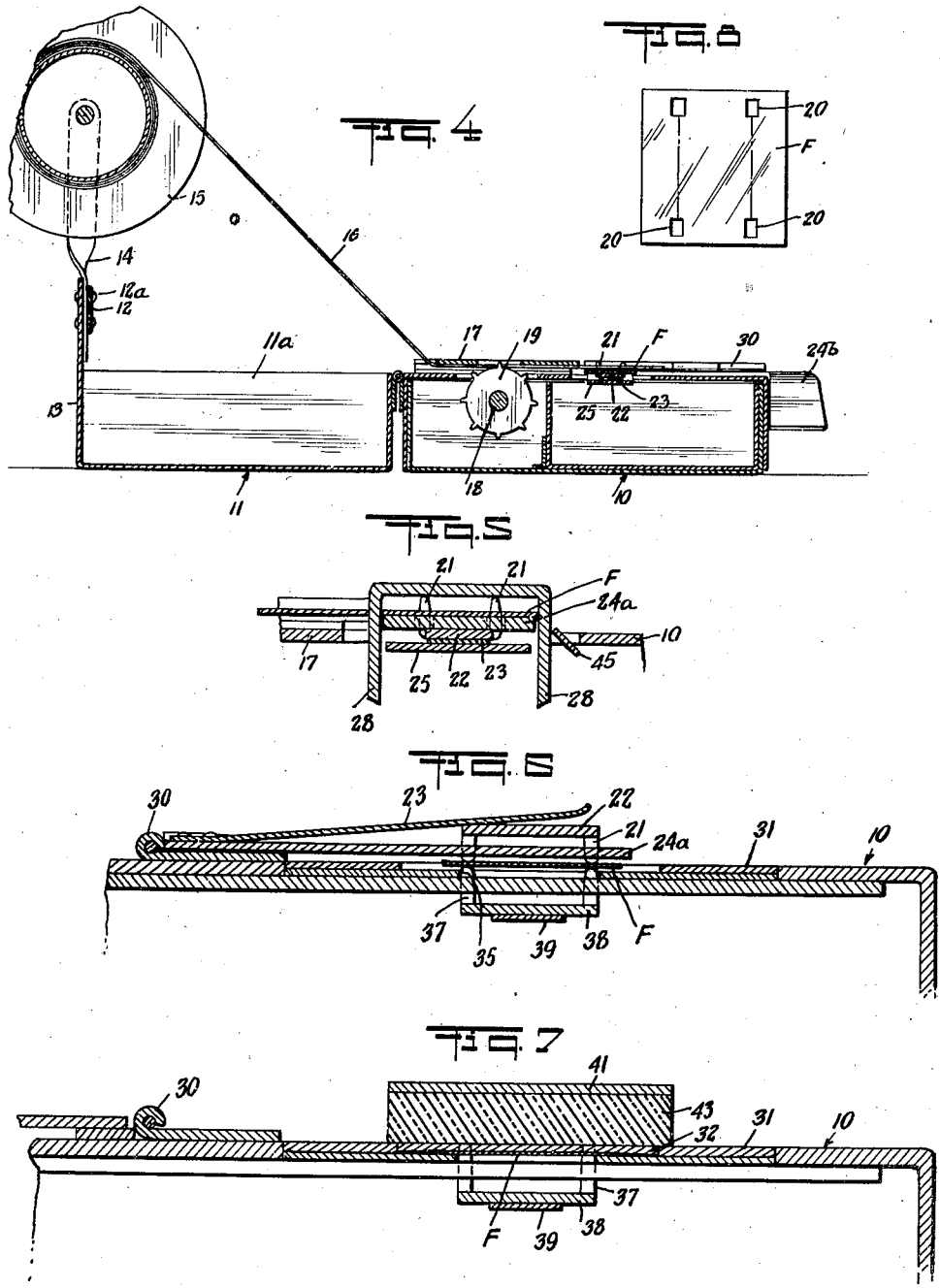

Patented Nov. 17, 1942

2,302,561

UNITED STATES PATENT OFFICE 2,302,561

FILM MOUNTER

Maurice Libby and Herman Roth, Larchmont, N. Y., said Roth assignor to said Libby Application February 8, 1941, Serial No. 378,110

9 Claims. (Cl. 154—1)

Our invention relates to photographic film mounting and more particularly to an apparatus for cutting and mounting selected film frames.

One of the objects of our invention is to provide a unitary device for effecting all the operations necessary to cut selected film frames from a reel, accurately transfer said frames to a photographic mount and seal said mounts whereby they are ready to be projected. The device thus offers a mechanical and thereby positive action which eliminates the uncertainty attendant with the former manual operations and insures a perfect result with a minimum of time and attention.

Another object of our invention is to provide an apparatus for mounting relatively small film such as that of the 16 millimeter size while controlling and insuring the most accurate centering of such film frames in a mount.

Other objects of our invention will be apparent from the following description, it being understood that the above general statements of the objects of our invention are intended to explain and not to limit it in any manner.

In the drawings,

Fig. 1 is a top plan fragmentary view of our device in the open position and ready for use;

Fig. 2 is a sectional view along the line 2—2 of Fig. 1 showing in dotted lines the operation of the swingable cutter and transposer;

Fig. 3 is a sectional view along the line 3—3 of Fig. 1, but showing the sealing of the mount with the film frame positioned therein;

Fig. 4 is a sectional view along the line 4—4 of Fig. 1;

Fig. 5 is an enlarged sectional view taken along the line 5—5 of Fig. 1 after the cutter member has been operated;

Fig. 6 is an enlarged sectional view taken along the line 6—6 of Fig. 1 after the transposing member has been operated positioning the film frame on the mount;

Fig. 7 is an enlarged sectional view similar to Fig. 6 after the return of the transposer member and the operation of the sealing member;

Fig. 8 is a plan view of a film portion as it is cut by the cutter member.

The device comprises a body portion 10 upon whose surface the cutting and mounting operations takes place, and a cover member 11, hinged to said body portion. The cover member 11 may be advantageously provided with compartments 11a for housing mounts, films, etc.

A metal plate 12 is maintained as by rivets 12a slightly spaced from the end wall 13 of cover member 11 and in this space is frictionally retained the bracket 14 upon which is rotatably mounted the film reel 15.

The film reel 15 has wound thereon film frames which have been inspected and marked by a procedure described in a co-pending application filed February 8, 1941, Serial No. 378,108, although said procedure is relevant hereto only in that selected frames are properly identified and any other means of identification may be used.

The film strip 6 is unwound slightly from the reel 15 and is manually inserted under the plate 17, while the knurled knob 18 of sprocket drum 19 is manipulated. When the teeth of sprocket drum 19 mesh with the usual marginal perforations 20 of the film strip, the device is ready for operation.

As the knob 18 is turned, the film 16 is fed under the plate 17 and emerging therefrom travels over the four pins 21 which slightly engage the four marginal perforations 20 of each film frame during the travel of the film 16. The pins 21 are rounded and while engaging the perforations 20, as aforesaid, do not appreciably impede the free movement thereof since continued manipulation of the sprocket drum 19 forces the film forward in spite of the pins 21. The pins 21, however, serve to center the film frames so that they may be accurately acted upon by the cutter member as will be hereinafter set forth.

The pins 21 constitute four projections on a member 22 which is urged, by a leaf spring 23, into four apertures in the arm 24a of transposer 24 so that the normal position of the pins 21 is within and protruding from said apertures, as shown in Figs. 2, 4 and 5. A metal strip 25, connected to the underside of the surface of body portion 10 functions as a back stop and support for said spring 23 and transposer 24.

A desired frame F is severed from the film 16 by pivoting the cutter C about its hinge 26 connected to the body 10.

The cutter C comprises a flat plate 27 which is U-shaped centrally thereof in cross-section forming the parallel knife blades 28 which are spaced apart exactly the width of two film frames for reasons to be hereinafter set forth. Secured to the plate 27 and disposed between the knife blades 28 is a spring finger 29.

The transposer 24 is U-shaped viewed planarly, and one of the arms thereof 24a bears the film frame to be mounted. The other arm 24b functions as a handle facilitating the pivoting of the transposer 24 about its hinge 30.

Formed in the upper surface of body 10 is a recessed bed 36 within which is placed the card mount 31 which will receive the film frame now maintained by pins 21 on the arm 24a of the transposer 24. Said card mount 31, subject of a co-pending application filed February 8, 1941, Serial No. 378,109, comprises a folded cardboard or paper and is formed with a peripheral flap 32, cut from the mount 31 and remaining integral at one edge 33 thereof, forming a recess in the mount for the reception of the selected film frame. The flap 32 is formed with an opening 34 whose dimensions are exactly those of the portion of the film frame to be projected while the other side has a larger opening 35 formed therein whose dimensions are exactly those of the film frame plus the marginal perforations 20.

As seen in Fig. 1, the mount 31 is maintained in the recessed bed 36 by four pins 37, which constitute projections on a member 38 in all respects identical with member 22. The pins 37 frictionally abut the walls of the opening 35 maintaining the mount 31 in position. The member 38 is urged outwardly by a leaf spring 39 secured to the underside of the surface of body 10 by rivets 40, so that the normal disposition of the pins 37 is in the projected position.

The flap 32 of the mount 31 is bent backwards so as not to interfere with the transposition of the film frame to the mount 31 and the underside of the flap 32, as well as the surface of the recess which its formation causes in the mount 31, is provided with rubber cement or preferably, a solution of para rubber in gasoline which has the property of adhering only to a similar surface without the necessity of moistening. However, any adhesive is operative.

Disposed laterally of the mount 31 and adjacent the flap 32 thereof, is a presser plate 41, hinged as by a hinge 42 to the upper surface of body 10. Secured to the face of the plate 41 by adhesive or any other suitable means is a pad 43 of a soft material such as sponge rubber or felt.

Our invention is practiced in the following manner:

Upon the reel 15 is wound the film 16 and we will assume that the selected film frames thereon are provided with suitable indicia so as to be identifiable upon cursory inspection. The reel 15 is mounted on the end wall 13 by its bracket 14 and the film 16 is manually inserted under the plate 17 while, as hereinbefore stated, the knob 18 is rotated until the teeth of the sprocket drum 19 catch in the perforations 20. Thereafter, further rotation of the knob 18 causes the film 16 to travel between the sprocket drum 19 and the plate 17, and emerge over the pins 21 on the arm 24a of the transposer 24. Should the film 16 catch against the arm 24a, slight manipulation of the transposer 24 about its hinge 30 is effective to re-direct the film over the pins 21.

As the film travels over the pins 21, which at this time serve to provide a definite stop means as the perforations 20 are slightly engaged by the pins 21, the operator notes a film frame which has been marked for mounting. After noting that such desired frame is engaged by the pins 21, he severs the film frame from the film 16 by operating the cutter C. A slot 44 formed on the upper surface of the body 10 is usually effective in catching and disposing of the cut front and unused portion 45 of the film, as noted in Fig. 5.

As the cutter C is swung by the operator to sever the desired film frame, the spring finger 29, preceding the knife blades 28 (Fig. 2), pushes the film well down on the pins 21 so as to both prepare the film for the cutting operation and to firmly seat the desired film frame on the pins 21. The knife blades 28, following the spring finger 29, sever the desired film frame and such blades 28, being spaced two film frames apart, actually sever both the desired film frame and an additional half frame on each side of the desired frame (Fig. 8). The additional half frames thus serve as margins permitting the subsequent retention of the film frame in the mount 31. As the cutter C is retracted, the spring finger 29, continues to bear against the severed film frame until the blades 28 are swung away, so that the retraction of the cutter C does not cause the displacement of the severed film frame from its seat on the pins 21 by adherence to the blades 28.

A mount 31 is placed in the recessed bed 36, the opening 35 of the mount embracing the pins 37 which thus retain the mount in place. As noted in Fig. 1, the flap 32 is bent back and overlaps the presser plate 41.

The arm 24b of the transposer 24 is then pivoted about the hinge 30 and the projecting pins 21 strike and rest upon the pins 37. The leaf spring 23 is so constructed as to be weaker than the leaf spring 39 with the result that continued pressure on the arm 24b causes the pins 21 to withdraw into the apertures of arm 24a thus releasing the severed film portion. The pins 37, remaining upstanding, are caused to enter the perforations 20 upon the withdrawal of the pins 21 so that the result is the transfer of the severed film portion onto the pins 37, which thereafter retain said film portion as illustrated in Fig. 6.

The transposer 24 is then pivoted back to normal position and the presser plate 41 is pivoted about the hinge 42, whereupon the flap 32 is urged into position and the adhesive takes effect sealing the mount while the film is positioned on the pins 37. Depression of the presser plate 41 forces the pins 37 downwardly against the action of the springs 39 and the flap 32 is therefore enabled to assume a flat position within the recess resulting from its formation. The mount is therefore perfectly formed with the film frame visible through the opening 34 just as it will be projected, while through the larger opening 35 can be seen the perforations 20. However, the opening 34 effectively screens these perforations so that they are not seen when the mounted film frame is projected.

When the presser plate 41 is swung back into normal position, the pins 37, returning by virtue of the spring 39, may again enter the perforations 20, but contacting the underside of the flap 32, cause the mount 31 to be lifted, whereupon the mount may be easily removed by the operator and the entire procedure repeated for further mounts.

While the procedure as detailed herein appears rather complex, in actual practice it is surprisingly simple and quick, the time consumed in mounting a desired film frame being but a few seconds. Notwithstanding its simplicity, however, a far better mount is produced than customary by known procedures.

We have shown a preferred embodiment of our invention but it is obvious that numerous changes and omissions may be made without departing from its spirit.

We claim:

1. An article of the character described comprising a support for a length of film, a transposer, means to feed said film over said transposer, and a cutter member for severing a desired film frame from said length of film while said film frame is located on said transposer, said transposer being operative to deposit said severed film frame in a mount.

2. An article of the character described comprising a support for a reel of film, a swingable transposer member, means to feed film from said reel onto said transposer member, a swingable cutter member adapted to sever a desired portion of said film while located on said transposer member, means to support a mount, said transposer member being operative to transfer said severed film portion from the cutting zone to a position on said mount and presser means for pressing said severed film portion into firm contact with said mount.

3. An article of the character described comprising a support for a length of film, a transposer member, pins on said transposer member adapted to engage said film by entering the perforations therein, a cutter member for severing a portion of said film while said portion is retained by said pins, means to support a mount, said transposer being operative to deposit said severed portion in said mount.

4. An article of the character described comprising a support for a length of film, a transposer member having a plurality of apertures formed therein, film engaging pins located in said apertures, spring means urging said pins within said apertures, means to feed said film over said transposer member whereby said film is engaged by said pins, a cutter member disposed adjacent said transposer member for severing a portion of film engaged by said pins, means to retain a mount, said transposer member being operative to swing said severed portion of film over said mount, and means to urge the withdrawal of said pins from said apertures against the action of said spring means whereby said severed portion of film is released from said transposer member.

5. An article of the character described comprising a transposer member, a set of pins on said transposer member for engaging a portion of film by entering the marginal perforations thereof, a cutter member for severing a desired portion of said film while it is disposed on said transposer member, means to retain a mount in position to receive said severed portion of film from said transposer, means associated with said mount for displacing said pins in relation to said transposer whereby said severed portion of film is released from said transposer and means to position said severed portion of film within said mount.

6. A film mounting apparatus comprising a transposer member having a plurality of apertures formed therein, a first set of film engaging pins normally located in said apertures, spring means urging said pins within said apertures in position to engage a portion of film by entering the marginal perforations thereof, means to retain a mount in position to receive said portion of film from said transposer member, a second set of film engaging pins projecting through said mount, said transposer member being operative to transfer said portion of film to a position on said mount, said second set of pins thereby contacting and urging said first set of pins out of said apertures to release said portion of film, means causing the withdrawal of said second set of pins when said portion of film is positioned within said mount and a sealing member for sealing said mount with said portion of film positioned therein.

7. A film mounting apparatus according to claim 6 including second spring means urging said second set of pins to the outward, operative position, said second spring means being stronger and of less resiliency than said first spring means whereby contact and applied pressure between said sets of pins causes the withdrawal of said first set of pins and the release of said portion of film, and wherein said sealing member causes the withdrawal of said second set of pins when operated whereby said mount is freed from said second set of pins when said sealing member is operated.

8. An article of the character described comprising a support for a reel of film, a swingable transposer member having a plurality of apertures formed therein, a first set of film engaging pins normally located within said apertures, first spring means urging said pins to said normal position whereby a portion of film may be retained by the entrance of said pins in the marginal perforations of said film, means to feed film from said reel over said pins to be engaged thereby, a cutter member located adjacent to said transposer member, a spring finger connected to said cutter member and having its end disposed anteriorly of the blades of said cutter member for urging said film into a position of engagement with said pins and for maintaining it thus after the action of said cutter member, means to support a mount in position to receive the cut portion of film from said transposer member, a second set of pins normally located within an opening in said mount and adapted to contact said first set of pins when said transposer member is swung over to deposit said cut portion of film in said mount, second spring means urging said second set of pins to said normal position, said second spring means being stronger and less resilient than said first spring means whereby said contact and pressure between said sets of pins cause the withdrawal into said transposer apertures of said first set of pins, the release of said cut portion of film therefrom and the positioning of said cut portion on said second set of pins, and a sealing member for sealing said mount with said cut portion of film positioned on said second set of pins, said sealing member bearing against said second set of pins against the action of said second spring means whereby said second set of pins is displaced from said mount opening enabling the sealing of said mount.

9. A film mounting apparatus comprising a support for a length of film, means to sever a desired film frame from said length of film, means to support a mount and a transposer for depositing said severed film frame in said mount.

MAURICE LIBBY.
HERMAN ROTH.